US010803480B2

(12) United States Patent
Andrades et al.

(10) Patent No.: US 10,803,480 B2
(45) Date of Patent: Oct. 13, 2020

(54) BIDDING AGENT WITH OPTIMIZED REACH LIMITATION

(71) Applicant: Alphonso Inc., Mountain View, CA (US)

(72) Inventors: Richard Andrades, Warminster, PA (US); Saket Gadia, Sunnyvale, CA (US)

(73) Assignee: Alphonso Inc.

( * ) Notice: Subject to any disclaimer, the term of this patent is extended or adjusted under 35 U.S.C. 154(b) by 58 days.

(21) Appl. No.: 16/241,969

(22) Filed: Jan. 7, 2019

(65) Prior Publication Data

US 2020/0219129 A1    Jul. 9, 2020

(51) Int. Cl.
*G06Q 30/02* (2012.01)

(52) U.S. Cl.
CPC ..... *G06Q 30/0244* (2013.01); *G06Q 30/0246* (2013.01); *G06Q 30/0275* (2013.01)

(58) Field of Classification Search
USPC ........................................................ 705/14.1
See application file for complete search history.

(56) References Cited

U.S. PATENT DOCUMENTS

| | | | |
|---|---|---|---|
| 8,316,411 B2 | 11/2012 | Weintraub et al. | |
| 9,055,333 B2 | 6/2015 | Whitten | |
| 9,094,720 B2 | 7/2015 | Malik | |
| 9,967,625 B2 | 5/2018 | Korst et al. | |
| 2002/0059313 A1 | 5/2002 | Yoon et al. | |
| 2002/0059584 A1 | 5/2002 | Ferman et al. | |
| 2002/0174430 A1 | 11/2002 | Ellis et al. | |
| 2004/0117829 A1 | 6/2004 | Karaoguz et al. | |
| 2006/0031889 A1 | 2/2006 | Bennett et al. | |
| 2006/0083434 A1 | 4/2006 | Inata et al. | |
| 2007/0124756 A1 | 5/2007 | Covell et al. | |
| 2007/0157247 A1 | 7/2007 | Cordray et al. | |
| 2007/0157260 A1 | 7/2007 | Walker | |
| 2007/0157281 A1 | 7/2007 | Ellis et al. | |
| 2008/0155059 A1 | 6/2008 | Hardin et al. | |
| 2008/0235733 A1 | 9/2008 | Heie et al. | |
| 2009/0201988 A1 | 8/2009 | Gazier et al. | |
| 2010/0086277 A1 | 4/2010 | Craner | |
| 2010/0231754 A1 | 9/2010 | Wang et al. | |
| 2011/0078717 A1 | 3/2011 | Drummond et al. | |
| 2011/0307929 A1 | 12/2011 | Youssefmir et al. | |
| 2012/0117339 A1 | 5/2012 | Kandekar et al. | |
| 2012/0210382 A1 | 8/2012 | Walker et al. | |

(Continued)

OTHER PUBLICATIONS

Recommender system. Retrieved Feb. 27, 2018, from https://en.wikipedia.org/wiki/Recommender_system.

*Primary Examiner* — Afaf Osman Bilal Ahmed
(74) *Attorney, Agent, or Firm* — Mark E. Ungerman; Ungerman IP PLLC (57) ABSTRACT

A method for maximizing the number of users who receive an optimal number of ad impressions. The method may be implemented for a bidding agent or in connection with a system for augmenting ad placement data across bidding platforms that bid on ad opportunities in a real-time bidding ad exchange. The system is able to use tracking pixels in order to optimize bid placements. The system is intended to manage user ad placement so as to increase the number of placements received by individual users so that the campaign has an increased impact on eligible users and reduces the diluted exposures to users who receive less than optimal exposure.

10 Claims, 8 Drawing Sheets

(56) References Cited

U.S. PATENT DOCUMENTS

| | | |
|---|---|---|
| 2013/0014187 A1 | 1/2013 | Huang et al. |
| 2013/0142499 A1 | 6/2013 | Major et al. |
| 2013/0174202 A1 | 7/2013 | Kim et al. |
| 2014/0013342 A1 | 1/2014 | Swan et al. |
| 2014/0025837 A1 | 1/2014 | Swenson et al. |
| 2014/0067898 A1 | 3/2014 | Steiner et al. |
| 2014/0165116 A1 | 6/2014 | Major et al. |
| 2014/0237525 A1 | 8/2014 | Rothschild et al. |
| 2014/0282761 A1 | 9/2014 | Bjordammen et al. |
| 2015/0334430 A1 | 11/2015 | Clapp |
| 2015/0350701 A1 | 12/2015 | Lemus et al. |

| 440 | | BID ID #1,345,937,948 | BID ID #5,738,447,981 |
|---|---|---|---|
| 503 | IP Address | 338.956.020 | 212.975.783 |
| 504 | Device ID | 55-593-558 | 93-220-493 |
| 505 | Operating System | Windows | Windows |
| 506 | Browser | Chrome | Firefox |
| 507 | Domain | espn.com | youtube.com |
| 508 | URL | www.espn.com | https://www.youtube.com/music |
| 509 | Timestamp | 294833920 | 940300941 |
| 510 | Country | 2 | 2 |
| 511 | Region | 55 | 12 |
| 512 | City | 185 | 843 |
| 513 | Ad Slot Size | 500*345 | 500*345 |
| 514 | Ad Exchange | Google | Google |
| 515 | Content Category | Sports | Music |
| 516 | Campaign ID | 23 | 43 |
| 517 | Creative ID | 499 | 275 |

BIDDING AGENT WITH OPTIMIZED REACH LIMITATION

BACKGROUND OF THE INVENTION

1. Field of the Invention

The invention relates to a data augmenter, and particularly to a tracking pixel-based data augmenter for intelligent real-time bidding.

2. Description of the Related Technology

Real-time bidding (RTB) is a procedure to buy/sell advertising inventory on a per-impression basis, via programmatic instantaneous auction, similar to financial markets. With real-time bidding, advertising buyers bid on an impression and, if the bid is won, the buyer's ad is instantly displayed on the publisher's site. Real-time bidding lets advertisers manage and optimize ads from multiple ad networks by granting the advertiser/bidding agency access to a multitude of different networks, allowing them to create and launch advertising campaigns, prioritize networks and allocate percentages of unsold inventory.

Real-time bidding is distinguishable from static auctions by how it is a per-impression way of bidding whereas static auctions are groups of up to several thousand impressions. RTB is promoted as more effective than static auctions for both advertisers and publishers in terms of advertising inventory sold, though the results vary by execution and local conditions.

A typical transaction begins with a user visiting a website. This triggers a bid request that can include various pieces of data such as the user's demographic information, browsing history, location, and the page being loaded. The request goes from the publisher to an ad exchange, which submits it and the accompanying data to multiple advertisers who automatically submit bids in real time to place their ads. Advertisers bid on each ad impression as it is served. The impression goes to the highest bidder and their ad is served on the page. This process is repeated for every ad slot on the page. RTB transactions typically happen within 100 milliseconds (including receiving the bid request and serving the ad) from the moment the ad exchange received the request.

The bidding happens autonomously and advertisers set maximum bids and budgets for an advertising campaign. The criteria for bidding on particular types of consumers can be very complex, taking into account everything from very detailed behavioral profiles to conversion data. Probabilistic models can be used to determine the probability for a click or a conversion given the user history data. This probability can be used to determine the size of the bid for the respective advertising slot.

A Real-time bidding system is shown in U.S. Pat. No. 6,324,519 B1 entitled, "Advertisement Auction System," and is expressly incorporated by reference herein and discloses an advertisement auction system in which content/opportunity providers announce to advertisers that they have an opportunity to present an advertisement to a consumer, and the advertiser transmits ad characterization information which is correlated with the consumer profile.

Data augmentation may be applied to many problems which involves the use of data to make decisions based on a set of criteria. Data augmentation adds value to data by adding information derived from internal and external sources. Data augmentation may be a way to reduce overfitting of models. Overfitting may arise when a model relies on a small or incomplete data set. Data augmentation systems may improve decision-making by either increasing the amount of data, or by improving methods that make use of the data.

A data augmentation system is shown in U.S. Pat. No. 8,332,334 B2 entitled, "System and Method for Cross Domain Learning for Data Augmentation," and is expressly incorporated by reference herein and discloses, in part, a system for generating a new target function using a labeled target domain data, a labeled source domain data, and a weighting factors for a labeled source domain data, for evaluating the performance of the new target function to determine if there is a convergence.

Tracking pixels are used on web pages or email, to unobtrusively (usually invisibly) allow confirmation that a user has accessed some content.

Tracking pixels may be used to track information such as who is reading a web page or email, when, and from which computer. They can also be used to see if an email was read or forwarded to someone else, or if a web page was copied to another website.

Often, emails and web pages may refer to content on another server, rather than including the content directly. When an email client or web browser prepares such an email or web page for display, it ordinarily sends a request to the server that is referred to in the content to send additional content.

These requests may include information such as the IP address of the requesting computer, the time the content was requested, the type of web browser that made the request, and the existence of cookies previously set by that server. The additional content may include a unique tracking pixel.

A tracking pixel may be a small (usually transparent) GIF or PNG image (or an image of the same color as the background) that is embedded in an HTML page, usually a page on the web or the content of an email. Tracking pixels may also use HTML IFRAME, style, script, input link, embed, object, and other tags to track usage. Whenever a user opens a webpage or email, such image and other information is downloaded. This download requires the browser to send a request to the server storing that image or information, allowing the organization running that server to keep track of the HTML page.

The use of a tracking agent for use in the online advertisement space is shown in U.S. Pat. No. 9,105,028 B2 entitled, "Monitoring Clickstream Behavior of Viewers of Online Advertisements and Search Results," and is expressly incorporated by reference herein and discloses tracking and analyzing a computer user's behavior after viewing a particular search result or a particular advertisement to assess the impact of having viewed the search result or advertisement.

The additional content may be an ad for insertion in the display of a web page. The ad may be fetched from a third-party ad server, not from the server the main webpage was fetched from. This configuration separates the advertiser from the ad delivery process. Advertisers may include a tracking pixel/web beacon to gather information relating to the ad placement from the consuming device. This allows the potential for the advertisers and/or ad agencies to confirm consumption of ads placed in content delivered by a publisher.

While tracking pixels are used in the same way in web pages or emails, they may have different purposes. If the tracking pixel is embedded in an email such as an HTML message, the tracking pixel may trigger interaction with an additional server when a user reads the email for the first time and/or each time that the user subsequently loads the email. Whenever a web page (with or without tracking pixel) is downloaded, the server holding the page knows and can store the IP address of the computer requesting the page; this information can therefore be retrieved from the server log files without the need of using tracking pixel. Tracking pixels may be advantageous when the monitoring party does not have access to or trust the server logs. This may happen when a web site owner does not control its web servers (such as in web hotels), because monitoring is done by a third party, or a greater level of detail needs to be recorded than is possible from web log analysis alone.

As with any files transferred using the Hypertext Transfer Protocol, a tracking pixel identifies the location of a resource that is being requested.

The URL referred to by the tracking pixel can be appended with a data string in various ways while still identifying the same object. The appended data string can be used to better identify the conditions under which the tracking pixel has been loaded. The appended data string may be included in the tracking pixel being sent to a user or may be formed at a user's browser, for example, by a JavaScript included in the tracking pixel or delivered in response to a resource request of the tracking pixel.

For example, an email sent to the address smith@example.org can contain the embedded "image" of with a URL http://smith.com/bug.gif?somebody@example.org. Whenever the user reads the email, the image at this URL is requested. The part of the URL after the question mark is ignored by the server for the purpose of determining which file to send, but the complete URL is stored in the server's log file. As a result, the file bug.gif is sent and shown in the email reader; at the same time, the server stores the fact that the particular email sent to smith@example.org has been read.

Tracking pixels may also be used in combination with HTTP cookies like any other object transferred using the HTTP protocol. Tracking pixels have several advantages over other tracking devices. For example, many modern browsers are configured to not allow cookies. In addition, cookies are not compatible with many mobile computing platforms.

U.S. Pat. No. 8,831,987 B2 entitled, "Managing Bids in a Real-time Auction for Advertisements," and is expressly incorporated by reference herein and shows a system for conducting an auction for advertising across multiple markets.

U.S. Pat. No. 6,324,519 B1 entitled, "Advertisement Auction System," and is expressly incorporated by reference herein, discloses an advertisement auction system in which content/opportunity providers announce to advertisers that they have an opportunity to present an advertisement to a consumer, and the advertiser transmits ad characterization information which is correlated with the consumer profile.

U.S. Pat. No. 7,856,378 B2 entitled, "Method and System for Facilitating Trading of Media Space" is expressly incorporated herein by reference, discloses a system for trading media space includes a server node which receives requests for media space from buyers and offers of media space from sellers. The server node includes a set of rules for matching one of the requests and one of the offers to form a matched request and offer pair. A delivery system is connected to said server node for facilitating delivery of media content between the buyer and seller of the matched pair.

U.S. Pat. No. 9,129,313 B1 entitled, "System and method for optimizing real-time bidding on online advertisement placements utilizing mixed probability methods" is expressly incorporated herein by reference, discloses a system and method for optimizing real-time bidding on advertisements by utilizing mixed probability methods. The system assigns several probability scores based on various criterion, and then calculates a combined probability score and threshold based on these scores when a real-time bid request is received.

U.S. Pat. No. 9,105,028 B2 entitled, "Monitoring Clickstream Behavior of Viewers of Online Advertisements and Search Results," and is expressly incorporated by reference herein, discloses tracking and analyzing a computer user's behavior after viewing a particular search result or a particular advertisement to assess the impact of having viewed the search result or advertisement.

U.S. Pat. No. 8,332,334 B2 entitled, "System and Method for Cross Domain Learning for Data Augmentation," and is expressly incorporated by reference herein, discloses in part generating a new target function using a labeled target domain data, a labeled source domain data, and a weighting factors for a labeled source domain data, an evaluating a performance of the new target function to determine if there is a convergence.

SUMMARY OF THE INVENTION

Tracking pixel data may be used by a data augmentation system in connection with a plurality of bidding platforms in order to optimize bid placements across more than one bidding platform in an RTB ad exchange or bidding platforms. It is an object to provide a system for tracking ad placements for an ad campaign or related campaigns with different bidding agencies and facilitate coordination. When an advertiser engages multiple bidding agencies for a campaign or related campaigns, it is possible that the bidding agencies may place ads using different bidding platforms. Ultimately, the agencies have no capability to coordinate in real time or know the overall status of a multi-agency or multi-platform campaign or of complimentary campaigns.

In order to facilitate coordination, each bidding platform associated with a campaign or related campaigns may embed ads with tracking pixels that cause ad placements/consumption to be accumulated. They may be addressed to a common a tracking pixel server or create a consolidated report of placements. A tracking pixel server may be connected to a plurality of bidding platforms.

It is a further object to facilitate coordination between bidding platforms such that the platforms optimize bidding strategy.

In general, aggregated tracking pixel data may be used to assist in actions that optimize ad placement by facilitating coordination among bidding agencies/entities. A tracking pixel server may facilitate coordination in a number of ways. A tracking pixel server may aggregate data across all connected bidding platforms and distribute aggregated data to the bidding platforms. A tracking pixel server may also generate reports. Advertisers may specify certain limits, thresholds, or other benchmarks for a campaign or related campaigns. There is currently no way to track such benchmarks when advertisers engage multiple bidding agencies. The tracking pixel server may address this problem by tracking the status of campaign benchmarks based on received tracking pixel data and informing the plurality of bidding platform servers of the status of benchmarks.

After making such determinations as to the status of a campaign benchmark, the tracking pixel server may be able to command or request that the plurality of bidding platform servers change their bidding behavior. In another embodiment, the tracking pixel server may be configured to periodically assess certain metrics, such as the reach of the advertisement. Such metrics may be compiled into reports and sent to the plurality of bidding platform servers in order to further inform bidding. Such reports may also be sent to advertisers in order to allow advertisers the opportunity to assess the status of the campaign.

An apparatus for tracking ad placements across platforms may include a user device display/browser configured to receive a tracking pixel containing at least an IP address or device ID and associated tracking pixel data. A tracking pixel server may be able to receive and process said tracking pixel from the user device display/browser, and may be configured to manage a database of tracking pixel data and generate reports of tracking pixel data. The apparatus may also include a plurality of bidding platform servers configured to receive the processed tracking pixel data and reports from the tracking pixel server, and may be configured to use the tracking pixel data to generate intelligent bids for ad placements associated with said tracking pixel data.

A method for augmenting ad placement data across platforms may comprise the steps of: receiving over a communication channel, a tracking pixel containing at least an IP address or device ID and associated tracking pixel data, updating a database of tracking pixel data, generating a report based on said tracking pixel data, distributing said report to a plurality of bidding platform servers, and generating intelligent bids by a plurality of bidding platform servers for ad placements based on said report of tracking pixel data.

An RTB ad server may include or be an ad exchange, such as AppNexus, AOL's Marketplace, Microsoft Ad Exchange, OpenX, Rubicon Project Exchange, Smaato, AdECN, DoubleClick. An ad exchange is a technology platform that facilitates the buying and selling of media advertising inventory from multiple ad networks. Prices for the inventory are determined through bidding.

A bidding platform server may include or be a demand-side platform (DSP) such as Adobe Media Optimizer, Adform, AppNexus, Centro Basis, DataXu, DoubleClick Bid Manager, Fiksu, Quantcast, MediaMath, Rocket Fuel, Remerge, Tapad, TubeMogul, and Zemanta. A DSP is a system that allows buyers of digital advertising inventory to manage their bids. The primary distinction between an ad network and a DSP is that DSPs have the technology to determine the value of an individual impression in real time (less than 100 milliseconds) based on the DSPs bid forming logic.

A tracking pixel may refer to an object that is designed to be embedded in a digital ad for tracking ad impressions. The tracking pixel includes code that automatically reports back to a remote server various tracking pixel data (see below) related to the ad impression, such as an IP address (IP) of a device that the digital ad was delivered to and the time of delivery. A tracking tag implemented through an embedded image, referred to as "a lightweight 1×1 pixel," may be used. As described herein, the time of delivery is presumed to be the same, or nearly the same, as the time that the ad impression is made (e.g., displayed) on the device.

"Tracking pixel data" may include identifiers and other optional additional data that are returned to the remote server from a device that receives the digital ad with the tracking pixel. The identifiers may include one or more of IP addresses and device ID's. Optional additional information may include the device ID, placement details of the digital ad on a display screen of the device, type of website or email used, time the email was read or website was visited, activities on the website during a session, operating system used (which may be indicative of the use of mobile devices), type of client used (for example a browser or mail program), and client's screen resolution.

A bid management system may maximize the number of users who receive an optimal number of ad impressions. The system may receive tracking pixel data signifying that a user has been exposed to an ad placement and update an impression count for a user that has been exposed to an eligible ad placement. The system may manage a list that contains a limited set of identifications of users eligible to receive ad impressions based on one or more tracking pixel identifiers, determine whether the updating results in eligible users reaching the optimum range ad impressions, and remove use identifications from the list of eligible users that have reach the optimum range of ad impressions from the list and replacing the user identifications with new user identifications eligible to receive ad impressions. The system may determine whether to bid for a placement opportunity by consulting the list of eligible user identifications from the list of eligible users when an impression count reaches a threshold and adds the user identifications to a saturation list. The system may determine if a user identification is on a saturation list and add a user identification to an eligible list upon a determination that the user identification is not on said saturation list. The system may manage a bidding process including reviewing parameters of an auction opportunity wherein one of the parameters is user identification, qualifying the auction opportunity on the basis of eligible user count and user exposure count, bidding on a qualified auction opportunity, and updating the user exposure count in the event of an auction success. The system may bid on an auction opportunity when said user ID corresponds to an eligible user ID. The system may increment the user exposure count upon a successful auction award. The system may compare the use exposure count to a saturation exposure count.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

The system may rely on real-time bidding. Real-time bidding may be used in order to place bids for electronic media impression auctions and, if the bid is won, the buyer's ad is instantly displayed on the publisher's site.

A key advantage of real-time bidding is the value of ads are optimized per impression, which allows advertisers to maximize ad effectiveness and publishers to maximize the value of their ads. Real-time bidding lets advertisers manage and optimize ads from multiple ad-networks by granting the user access to a multitude of different networks, allowing them to create and launch advertising campaigns, prioritize networks and allocate percentages of unsold inventory.

Advertisers may wish for users to receive an optimal number of impressions of a particular ad or campaign. Users may require a minimum number of impressions before the ad becomes effective. Yet, once a threshold number of impressions has been reached, the ad placement may become oversaturated for the user, at which point additional impressions provide little to no further value to the advertiser. This oversaturation may additionally result in negative consequences for the advertiser due to the annoyance of repetitive impressions to the user. Preferably, all targeted users receive more than a minimum number of impressions, but less than the threshold. Without data augmentation facilitating coordination between bidding platforms, proving this optimal number of impressions is difficult because the number of ad opportunities that a bidding agent may receive for a device or IP address is not predictable.

Advertisers may wish to maximize the number of users who receive an optimal placement of ads. This may be achieved by limiting the reach of the campaign, rather than allowing the bidding agents to submit bids on ad opportunities for any user satisfying the campaign criteria. An unlimited pool of users receiving impressions often results in poor outcomes for the advertiser by providing a large number of users with less than the minimum number of impressions to be effective. The campaign may reach the overall limit of impressions before a substantial number of users has reached the minimum number of impressions for the ad to be effective. On the other hand, a limited set of users are more likely to receive multiple impressions before the overall limit is reached. This may be accomplished by limiting the number of users who are eligible to receive bids. As users receive the minimal number of impressions, the number of unique users may be increased by removing the user from ad placement eligibility when that user has received the minimal of placements.

The system may rely on tracking pixels. A tracking pixel may be a small (usually transparent) GIF or PNG image that is embedded in an HTML page, usually a webpage or the content of an email. Tracking pixels may also use HTML IFRAME, style, script, input link, embed, object, and other tags. When a user opens a webpage or email, such image and other information is downloaded. This download requires the browser to send a request to the server storing that image or information, allowing the party running that server to keep track of the HTML page.

According to an advantageous feature, tracking pixels may be fetched from a third-party ad server, not from the server the main webpage was fetched from. Because of this, advertisers may gather information about visitors when visitors request HTML content from the main webpage server and can thus track certain properties of the browsing habits of web users.

The tracking pixel server may be utilized in order to maximize the number of users who receive an optimal placement of ads. The tracking pixel server may achieve this by limiting the reach of the campaign, rather than allowing the bidding agents to submit bids on ad opportunities for any user satisfying the campaign criteria. An unlimited pool of users receiving impressions often results in poor outcomes for the advertiser by providing a large number of users with less than the minimum number of impressions. The campaign may reach the overall limit of impressions before a substantial number of users has reached the minimum number of impressions. On the other hand, a limited set of users are more likely to receive multiple impressions before the overall limit is reached. This may be accomplished by limiting the number of users who are eligible to receive bids. As users receive the minimal number of impressions, the number of unique users may be increased by removing the user from ad placement eligibility when that user has received the minimal of placements.

Figure 1:
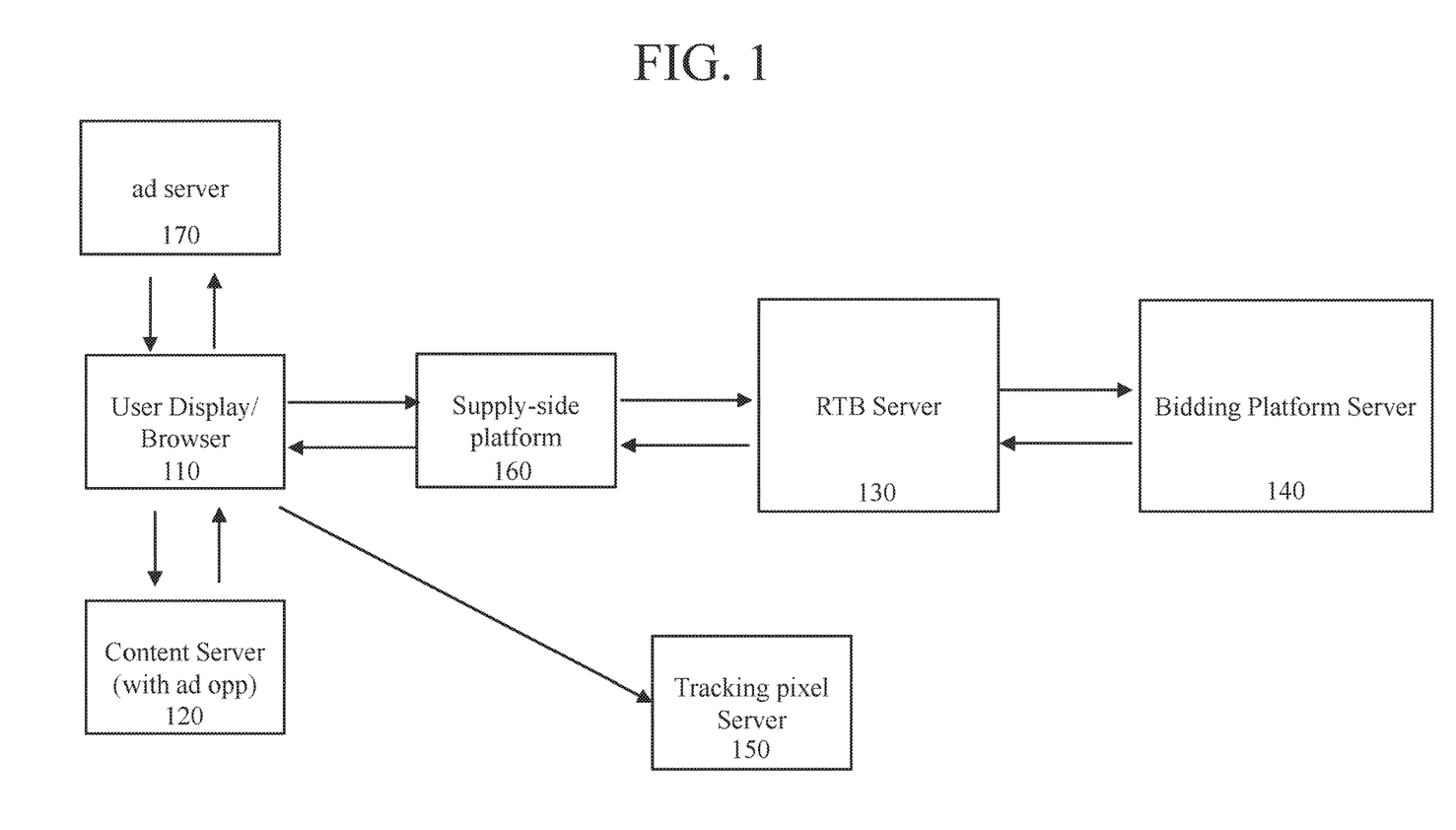
FIG. 1 schematically shows a system for a real-time bidding ad exchange.

FIG. 1 schematically shows a system for a real-time bidding ad exchange. FIG. 1 shows a user display or browser 110 that displays an ad to a user. The user display or browser 110 may be attached to a stationary device or mobile device such as a smart phone, tablet or other device. The user display or browser 110 may be configured to access web sites using HTTP protocol or another protocol. The webpage accessed by the user display or browser 110 may contain Internet HTML reference to a content server 120. Upon the user accessing the content of the publisher, the content server 120 returns the requested content to the user display or browser 110, which may be in the form of HTML. The returned HTML may contain an opportunity to display an ad. The HTML directs the user display or browser 110 where to retrieve ad content.

In the embodiment shown in FIG. 1, HTML directs the user display or browser 110 to retrieve the ad from a supply-side platform 160. The supply-side platform 160 may optionally perform operations on the ad request, such as acquiring information about the user from the data provider. The supply-side platform 160 then sends the ad request to an RTB server 130. The RTB server 130 may be connected to bidding platform servers 140 (only one shown for clarity). After receiving the ad opportunity, the RTB server 130 is configured to "auction" the ad opportunity to the bidding platform servers 140.

Each bidding platform server 140 may be bidding on behalf of one or more advertisers or campaigns. The bidding platform servers 140 may use internal logic to determine how to value a particular bid for an ad, based on a number of criteria regarding the ad or campaign. In addition, the bidding platform servers 140 may use the information about the ad opportunity and the user requesting the ad, as provided by the RTB server 130, in order to assess the value of the ad opportunity to the advertiser. The bidding platform servers 140 then send their bids for the ad opportunity to the RTB server 130, which determines which bid will fulfill the ad opportunity.

A content publisher may have the capacity to preempt an auction by maintaining a publisher ad server. The publisher ad server may have pre-cached criteria for which, when satisfied, prempts delivery of the ad opportunity to the RTB server. In this case, the criteria is satisfied and the HTML code directs the user display or browser 110 to the publisher ad server rather than the RTB server 130. The functions of the publisher ad server could also advantageously be performed by the supply-side platform 160.

When an ad opportunity if fulfilled by the RTB server 130, the bidding platform server 140 (or equivalent) of the winning bid passes instructions to the RTB server 130 for retrieving the ad. In the embodiment shown in FIG. 1, these instructions are passed to the supply-side platform 160, and then to an open HTTP connection of the user display/browser 110. In another embodiment, the instructions may be passed through additional locations such as a publisher ad server, or the RTB server 130 may pass the instructions directly to the user display/browser 110.

The user display/browser 110 then follows the instructions to retrieve the ad from an ad server 170. In one embodiment, the ad server 170 may be advantageously contained within the bidding platform server 140. Upon receiving the request for the placement of an ad, the ad server 170 delivers the ad to the user display/browser 110 or delivers the address of the ad to the browser 110, which in turn may retrieve the ad from the address indicated.

The ad delivered to the user display/browser 110 may be embedded with a tracking pixel or web beacon in order to track the ad impression. A tracking pixel may be a small GIF or PNG image that is embedded in an HTML page. The image may be transparent or may be the same color as the background. Tracking pixels may also use HTML IFRAME, style, script, input link, embed, object, and other tags to track the ad impression. The tracking pixel may include an external link to a tracking pixel server 150. When the HTML code is processed by the user display/browser 110, the user display/browser 110 executes the code of or associated with the tracking pixel. This may be a report to a tracking pixel server 150 or a request for content from the tracking pixel server 150. The content from the tracking pixel server 150 or the code associated with the tracking pixel may cause tracking pixel data to be transmitted. Tracking pixel data may include one or more identifiers and/or other optional additional data. The identifier may include one or more of IP addresses and/or device ID's. Optional additional information may include the device ID, placement details of the digital ad on a display screen of the device, type of website or email used, time the email was read or website was visited, activities on the website during a session, operating system used (which may be indicative of the use of mobile devices), type of client used (for example a browser or mail program), and client screen resolution. Tracking pixels may facilitate tracking ads delivered as web content or content delivered by email.

Once the tracking pixel server 150 receives the tracking pixel and tracking pixel data, the tracking pixel server 150 may record the tracking pixel data in the tracking pixel server logs.

Figure 2:
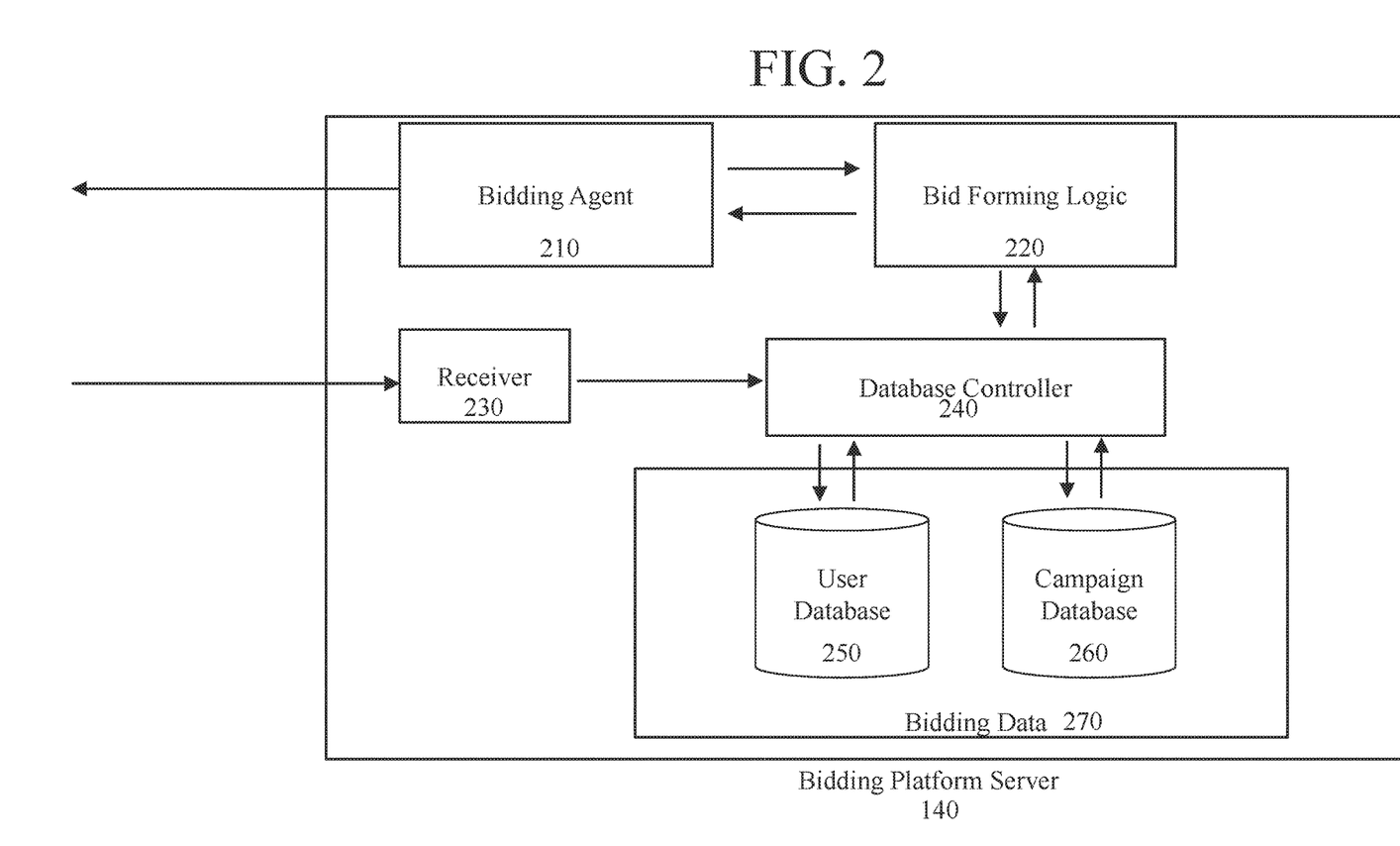
FIG. 2 shows a schematic of a bidding platform server.

FIG. 2 shows a schematic of a bidding platform server. FIG. 2 shows a receiver 230 that is configured to receive an ad opportunity. The bid may include information such as the user's IP address, device ID, and user data such as demographic information. The receiver 230 may be configured to send the ad opportunity to a database controller 240. The database controller 240 may have access to several types of data that may be used to inform bids. A user database 250 may contain data indexed by users' IP address or device ID and may also contain information such as personal or demographic information, user preferences, and prior advertising exposure of the user.

A campaign database 260 may include information regarding the desired criteria for ad opportunities. For example, an ad campaign may be set up to target a certain geographic region or certain demographic of people. The campaign database 260 may also include information such as the budgetary constraints of the campaign or specification of content for ad placement. For example, an ad campaign may limit the total spend amount, spend per ad, and specify websites for ad placements.

The collection of data that informs the bid may be referred to as the bidding data 270. While the embodiment in FIG. 2 shows a user database 250 and campaign database 260, any number of databases may be maintained to inform bidding. For example, an ad for sunscreen may find greater value in fulfilling ad opportunities based on weather. In this case, the bidding data 270 may include an additional database that contains information regarding the current weather by geographic location.

The database controller 240 may inform the bid forming logic 220 of the bid opportunity. The bid forming logic 220 may be configured to assess the bid opportunity based on the information regarding the bid opportunity and the bidding data 270. The bid forming logic 220 may use any number of methods for valuing bids based on datasets, as is known in the art. For example, some approaches may simply use a weighed sum of criteria vectors for resource constrained applications, while other sophisticated methods may use machine learning techniques such as Bayesian Classifiers, cluster analysis, decision trees, and artificial neural networks.

U.S. Pat. No. 9,129,313 B1 entitled, "System and method for optimizing real-time bidding on online advertisement placements utilizing mixed probability methods" is expressly incorporated herein by reference, discloses a system and method for optimizing real-time bidding on advertisements by utilizing mixed probability methods. The system assigns several probability scores based on various criterion, and then calculates a combined probability score and threshold based on these scores when a real-time bid request is received.

The bid forming logic 220 may establish and transmit bidding parameters to the bidding agent 210. The format of this communication may depend on the particular embodiment. In a real-time bidding environment in which the RTB server auctions the ad opportunity to the highest bidder, the communication from the bid forming logic 220 to the bidding agent 210 may be in the form of the bid amount. The bidding agent 210 may be configured to interact with an RTB server.

Figure 3:
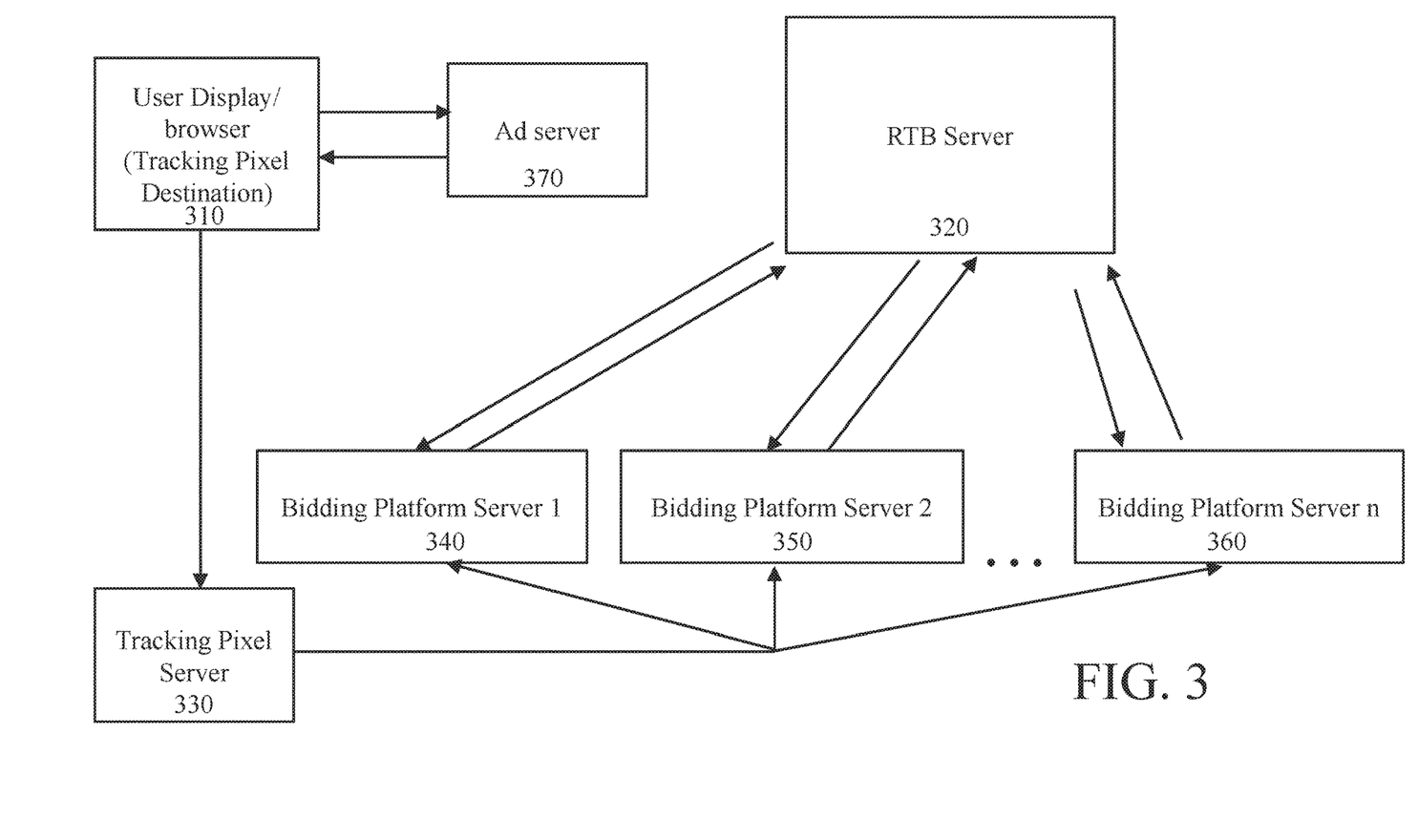
FIG. 3 shows an embodiment of a system for cross platform real-time bidding data augmentation.

FIG. 3 shows an embodiment of a system for cross platform real-time bidding data augmentation for use with an RTB server 320. As shown previously in FIG. 1, the user display/browser 310 follows the instructions to retrieve the ad from the ad server 370. Upon receiving the request for the placement of an ad, the ad server 370 delivers the ad to the user display/browser 310. The ad delivered to the user display/browser 310 may have an embedded tracking pixel in order to track the ad impression.

The tracking pixel includes an external link to a tracking pixel server 330. When the HTML code is processed by the user display/browser 310, the user display/browser 310 sends the tracking pixel data to the tracking pixel server 330. Tracking pixel data may include identifiers and may include other optional additional data.

The tracking pixel server 330 may be connected to a plurality of bidding platform servers 340, 350, 360. The embodiment in FIG. 3 shows three bidding platform servers, but it will be appreciated by those skilled in the art that any number may be used depending on the particular embodiment. According to an advantageous feature, the tracking pixel server 330 may facilitate coordination between bidding platforms severs 340, 350, 360.

For example, an advertiser may engage multiple bidding agencies for a campaign or related campaigns. Multiple bidding platform servers currently have no way of knowing the current status of complimentary campaigns. In order to facilitate coordination, each bidding platforms severs 340, 350, 360 associated with a campaign or related campaigns may embed ads with tracking pixels that have the same address. The embodiment in FIG. 3 shows that this address may be a single tracking pixel server 330. In another embodiment, bidding platforms sever 340, 350, 360 may address tracking pixels to different tracking pixel servers. In this embodiment, each tracking pixel server is configured to either share tracking pixel data or forward tracking pixel data to a common tracking pixel server. In addition, or alternatively, multiple tracking pixel servers may forward tracking pixel data to one or more bidding platform servers.

Figure 4:
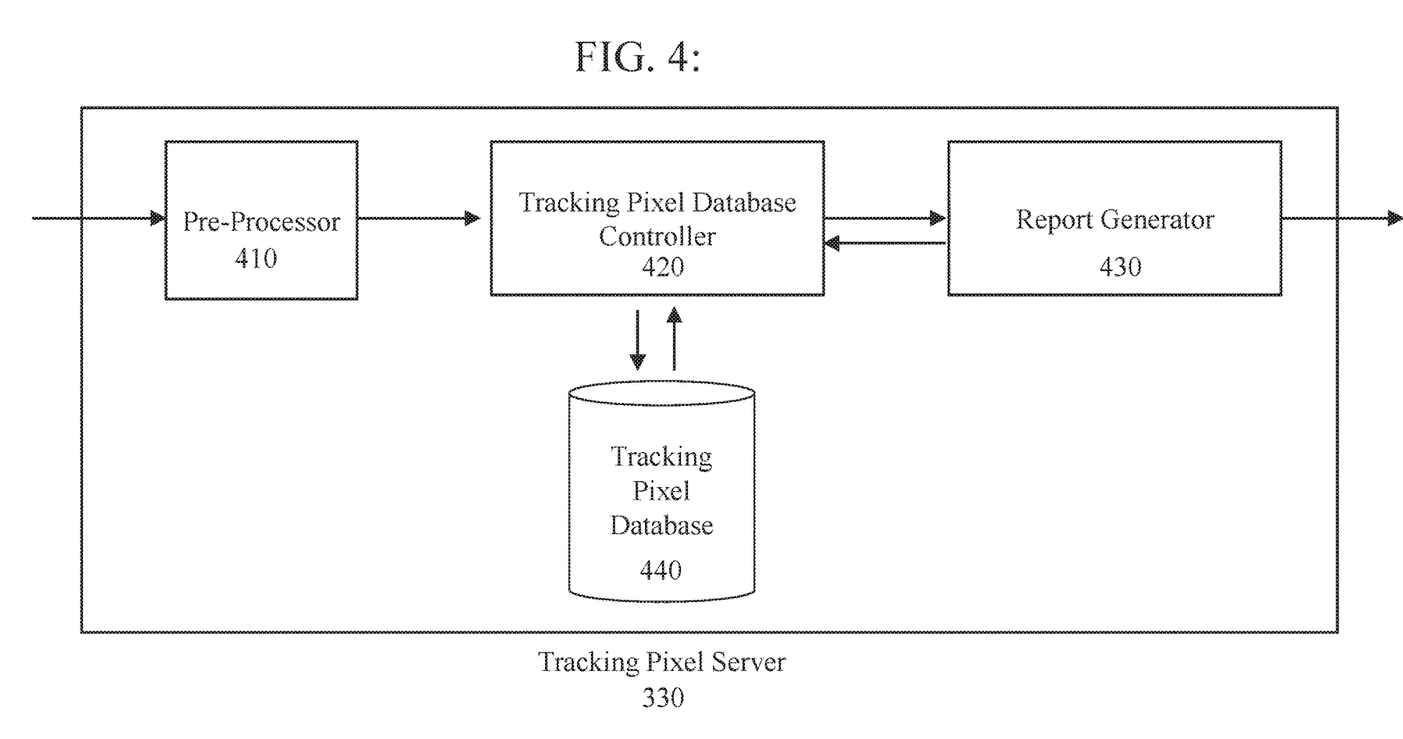
FIG. 4 shows a schematic of a tracking pixel server.

FIG. 4 shows a schematic of a tracking pixel server. According to an advantageous feature, the tracking pixel server may be placed on a standalone server or integrated with another component of the system, such as a bidding platform server. A pre-processor 410 may receive the tracking pixel data, and optionally, additional data. The pre-processor 410 may format and segregate the incoming information according to the requirements of the particular embodiment. After converting the information into an acceptable format, the pre-processor 410 may deliver some or all of the information to a tracking pixel database controller 420. The tracking pixel database controller 420 may be connected to a tracking pixel database 440 that maintains tracking pixel data of a plurality of bidding platforms. The tracking pixel database controller 420 may first log the receipt of the tracking pixel data, as well as any other metadata such as a timestamp of the receipt, in the tracking pixel database 440.

The tracking pixel database controller 420 may then update a tracking pixel database 440 with the received tracking pixel data according to the particular embodiment. The tracking pixel database controller 420 may first query the tracking pixel database 440 to determine if the identifier of the tracking pixel is already found in the tracking pixel database 440. If the identifier is not found in the tracking pixel database 440, the tracking pixel database controller 420 may direct the tracking pixel database 440 to create a new user entry. User entries may be indexed by one or more identifiers, such as the IP address or device ID. If the identifier of the tracking pixel is already found in the tracking pixel database 440, the tracking pixel database controller 420 may update the existing user entry.

In addition, or alternatively, the report generator 430 may be maintained in order to periodically inform the plurality of bidding platform servers of received tracking pixels and tracking pixel data. The format and frequency of this informing depends on the particular embodiment. In one embodiment, the report generator 430 may inform the plurality of bidding platform servers of a received tracking pixel (and tracking pixel data) every time the tracking pixel server receives a tracking pixel. In another embodiment, the report generator 430 may maintain a cache of received tracking pixels and tracking pixel data and send aggregated tracking pixel data at specified intervals. The tracking pixel database 440 may also be formatted to maintain a cache of tracking pixel data that has been receives since the last time the report generator 430 provided the plurality of bidding platform servers with a report of tracking pixel data.

The report generator 430 may also be configured to track campaigns or related campaigns. Campaign information, as well as other information (such as information from external sources including third-party information or user information) that may assist in optimizing bids such as current event data, may be stored in the report generator 430 or another location, depending on the implementation. Advertisers may specify certain limits, thresholds, or other benchmarks with a campaigns or related campaigns. For example, an advertiser may want limit the number of ad placements across all bidding platforms for a campaign or may want to set a minimum or maximum number of unique users across all bidding platforms. The report generator 430 may be able to inform the plurality of bidding platform servers of the status of benchmarks.

The report generator 430 may use such campaign information in conjunction with aggregated tracking pixel data in the tracking pixel database 440 to make determinations as to the status of reaching particular campaign benchmarks. After making such determinations as to the status of a campaign benchmark, the report generator 430 may to command or request that one or more bidding platform servers change their bidding behavior. For example, an advertiser may want to specify an allowable range of the number of ads in a certain geographic region per week. If the report generator 430 determines that the maximum number of ads has been reached, the report generator 430 may command bidding platform servers to stop placing bids for that ad. Conversely, the report generator 430 may request that the bidding platform servers change their bidding criteria to place more bids if the campaign is in danger of not meeting an ad quota.

The report generator 430 may also use aggregated tracking pixel data in the tracking pixel database 440 to assist in any other action that facilitates satisfaction of ad placement criteria. In one embodiment, the report generator 430 may be configured to periodically assess certain metrics, such as the reach of an advertisement. For example, the report generator 430 may request from the tracking pixel database controller 420 the geographic location of ad placements over a certain time period. The report generator 430 may then generate aggregate statistics and assess the reach of the campaign in a geographic location. Such aggregate statistics may be compiled into reports and sent to bidding platform servers in order to further inform bidding. Such reports may also be sent to advertisers in order to allow advertisers the opportunity to assess the status of the campaign.

Figure 5:
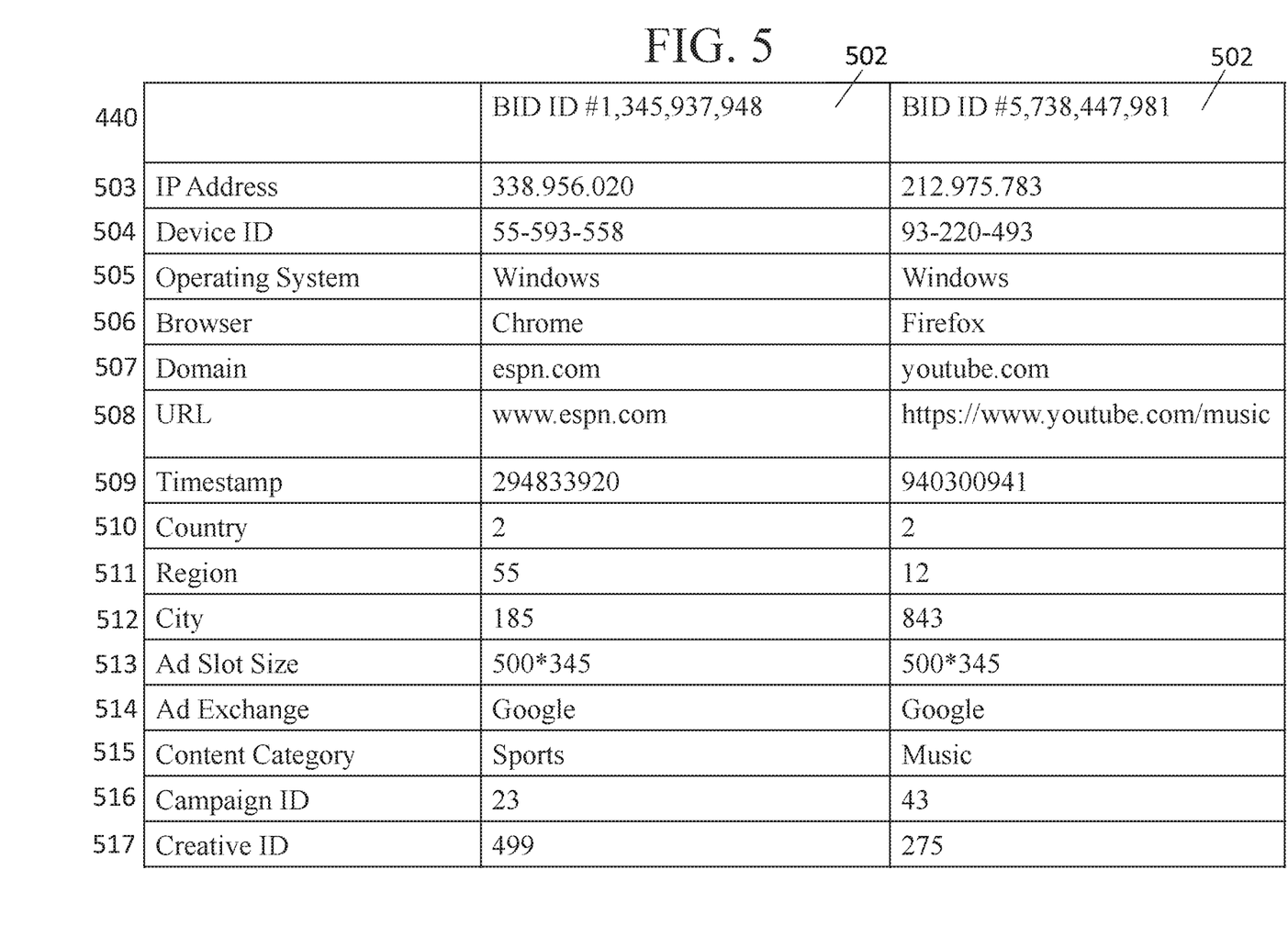
FIG. 5 shows an example of content in a tracking pixel database.

FIG. 5 shows an example of content in a tracking pixel database 501. Tracking pixel data may be indexed by a unique identifier such as a Bid ID 502 (as shown), or another identifier such as the IP address 503 and/or device ID 504. The set of optional tracking pixel data is meant to be illustrative, not exhaustive and may include such information as operating system 505, browser 506, domain 507, URL 508, time stamp 509, country 510, region 511, city 512, ad slot size 513, ad exchange 514, content category 515, campaign ID 516, and creative ID 517.

Figure 6:
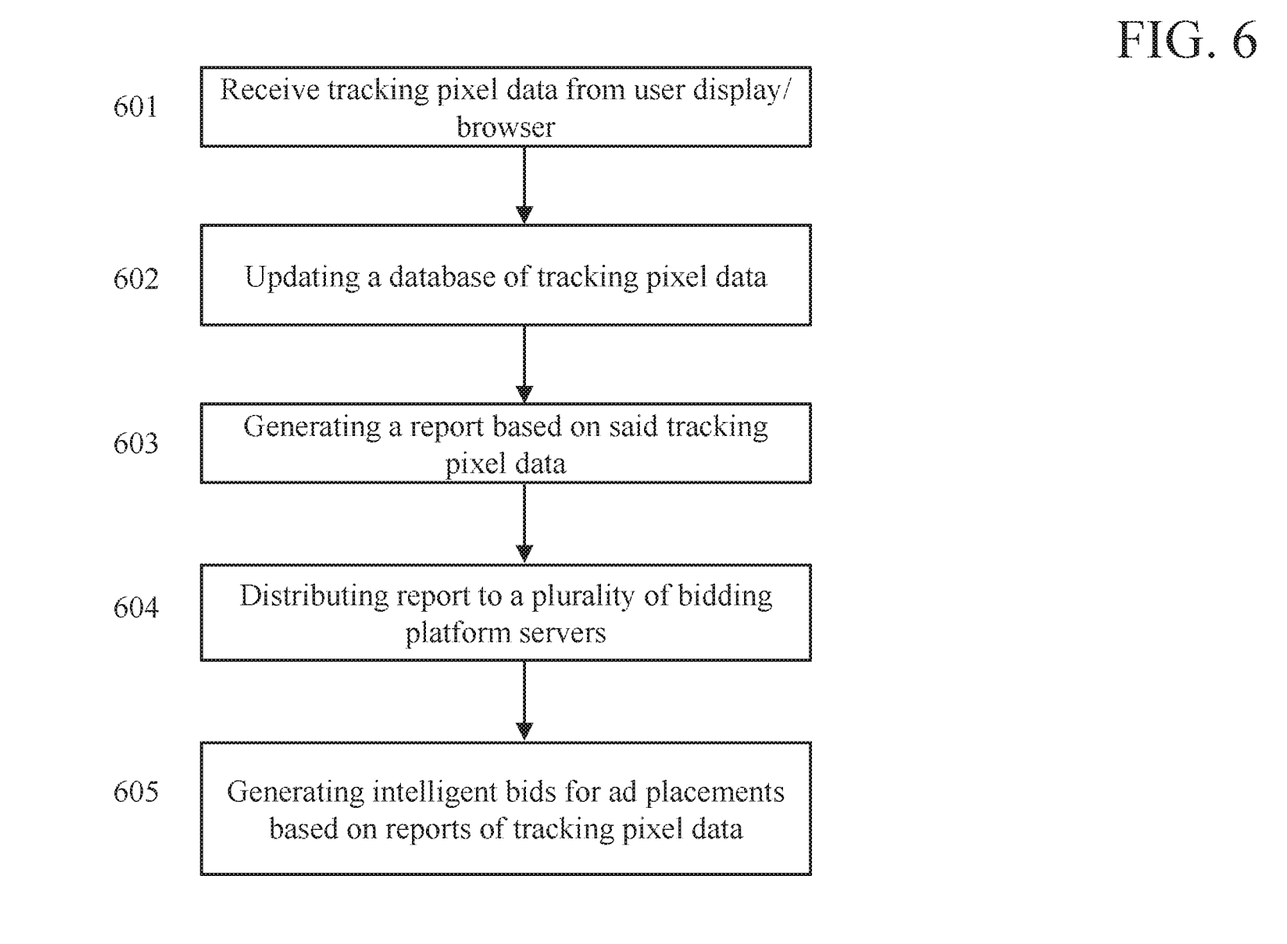
FIG. 6 schematically shows a flow diagram of an embodiment for cross platform real-time bidding data augmentation.

FIG. 6 schematically shows a flow diagram of an embodiment for cross platform real-time bidding data augmentation. The tracking pixel server 330 receives the tracking pixel data from the user display/browser 310 in step 601. The receiving step 601 may involve pre-processing in order to format and segregate incoming information according to the requirements of the particular embodiment. A database of tracking pixel data may be updated with the received tracking pixel data in step 602. The updating operations 602 may depend on the particular tracking pixel data and implementation. For example, tracking pixel data with an identifier that is unknown to the tracking pixel database 440 may require the tracking pixel database controller 420 direct the tracking pixel database 440 to create a new entity entry, while a known identifier may result in the tracking pixel database controller 420 updating the existing entity entry.

A report of the tracking pixel data may be generated by the report generator 430 in step 603. The report may represent tracking pixel data from more than one bidding platform server, and thus the resulting report may provide augmented data to a bidding platform server that was previously unavailable to the individual bidding platform servers. The reports may take a variety of different forms, depending on the particular embodiment. In one embodiment, the report generator 430 may be maintained in order to provide aggregated but unadulterated tracking pixel data to one or more bidding platform servers. In this embodiment, bidding platform servers may each analyze the tracking pixel data individually in order to optimize their bidding strategies.

In another embodiment, report generator 430 may use such campaign information in conjunction with the aggregated tracking pixel data in the tracking pixel database 440 to compare against campaign benchmarks, as discussed above. In this embodiment, the report generator 430 may make determinations that result in commands or requests that bidding platform servers change their bidding behavior.

In yet another embodiment, report generator 430 may be configured to periodically assess certain metrics, such as the reach of the advertisement.

In each embodiment of step 603, the result is that the report is delivered to bidding platform servers in step 604. The nature of how the report is delivered depends on the specific implementation of the tracking pixel server. As discussed above, the tracking pixel server may be placed on a standalone server or integrated with another component of the system, such as a bidding platform server.

The report may be used in order to generate intelligent bids for ad placements in step 605. In one, bidding platform servers may update the bid forming logic 220 with the report. Because the report is generated with augmented data, the bid forming logic 220 may alter bid placements. In an embodiment in which the report contains aggregated tracking pixel data form, the report may be used to populate the user database 250, the campaign database 260, or any other form of data in the bidding data 270. According to this embodiment, the bid forming logic 220 may alter bid placement parameters based on data from other bidding platform servers.

Figure 7:
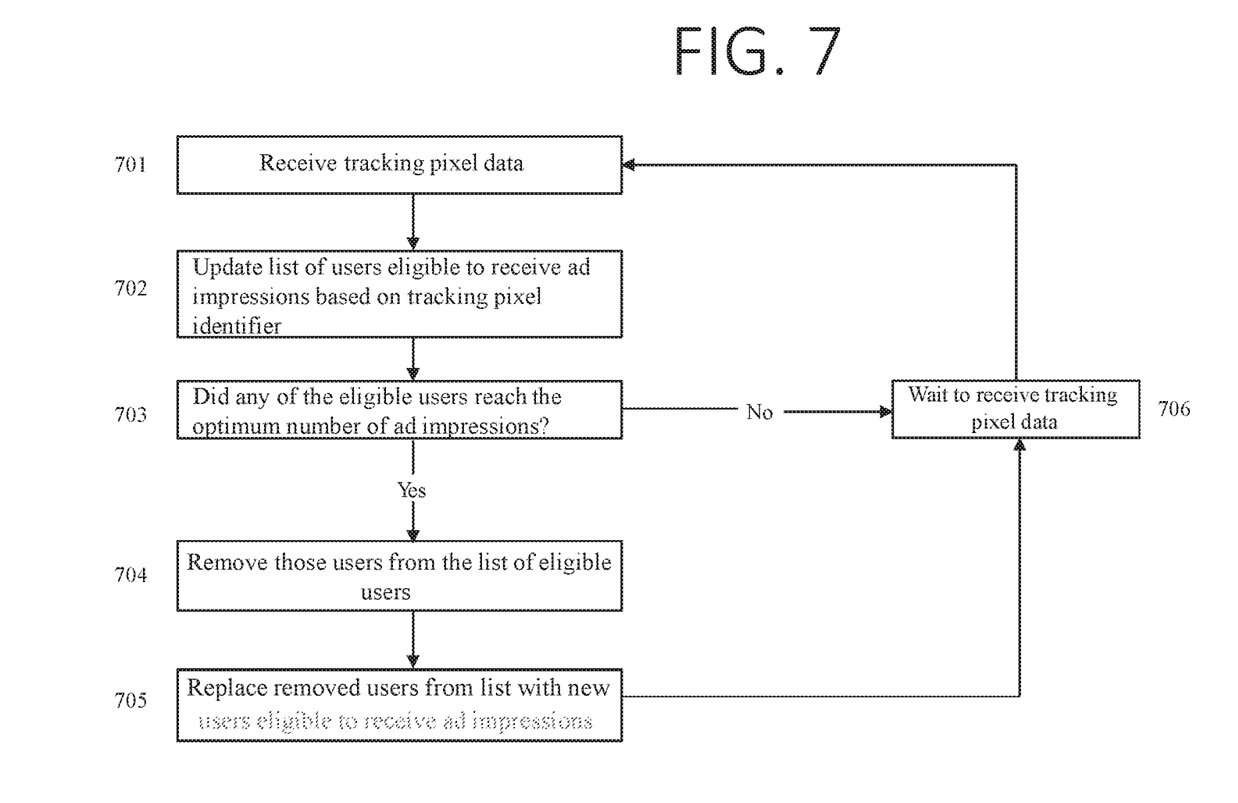
FIG. 7 schematically shows a flow diagram of an embodiment for maximizing the number of users who receive an optimal number of ad impressions by reach limitation.

FIG. 7 schematically shows a flow diagram of an embodiment for maximizing the number of users who receive an optimal number of ad impressions by imposing [a] reach limitation. The tracking pixel database controller 420 receives tracking pixel data in 701. Tracking pixel data may be a single tracking pixel or a plurality of tracking pixels aggregated over a time period. Tracking pixel data may be aggregated in the tracking pixel database controller 420 itself or another location, such as the pre-processor 410. The tracking pixel data is then used to update the list of limited set of users eligible to receive ad impressions based on tracking pixel identifier in 702. The list of eligible users may be generated by a component within the tracking pixel server or may be received from the advertiser or a third party. The list may be indexed by one or more identifiers, depending on the particular embodiment. The relevant identifier of the tracking pixel data may correspond to the identifier used to index the list of limited set of eligible users, such as the IP addresses and/or device ID.

The list of the limited set of eligible users maintains a record of the number of times that each user has received an impression. Based on the updated tracking pixel data, it is then determined whether any of the eligible users have reached the optimum number of ad impressions in 703. The optimum number of impressions may depend on the particular embodiment. If both the minimum number of impressions (before the ad placement reaches the desired effectiveness) and the threshold number of impressions (after which the impression has little or no further value) are known, the optimum number may be chosen to be more than the minimum number, but less than the threshold. For example, the optimum number of impressions may be chosen to be one less than the threshold number. How impressions are counted may also depend on the particular embodiment. For example, the advertiser may wish to limit the number of impressions per user for each ad placement or may wish to limit the aggregate number of impressions per user for the entire campaign.

If one or more users reach the optimum number of ad impressions, those users are removed from the list of eligible users in 704. The removed users are then replaced with new users to be eligible to receive ad impressions in 705. If the tracking pixel data does not result in any users reaching the optimum number of ad impressions, then system may wait for further tracking pixel data to be received in 706. Other metrics may also be periodically assessed by the tracking pixel database controller 420 or report generator 430 in order to determine whether to perform additional functions on the list of eligible users, such as the overall reach of the campaign or budget constraints. For example, the replacement of eligible users in 705 may be slowed or stopped entirely when the total budget of the campaign is close to being reached.

The reach limitations may be tracked at an individual bidding agent, or if cross-platform augmentation is used, at a tracking pixel server. In either case, the reach limitation may be governed by an automatically-populated list. The entries in the list may be made when a successful bid for an ad placement is awarded. A user ID may be added to the list with a placement count. Each time an opportunity is received that satisfied bidding criteria, the list is consulted to determine if the user is eligible to receive the placement. If the user is on the list, the bid is made. If the bid is successful, the placement count for the user may be incremented. Once the placement count reaches a threshold, the user may be removed from the eligible list and placed on a saturation list. If the eligible list is not full and the user is not on a saturation list, then the bid may be placed. If the bid is successful, the user will be added to the eligible list.

Figure 8:
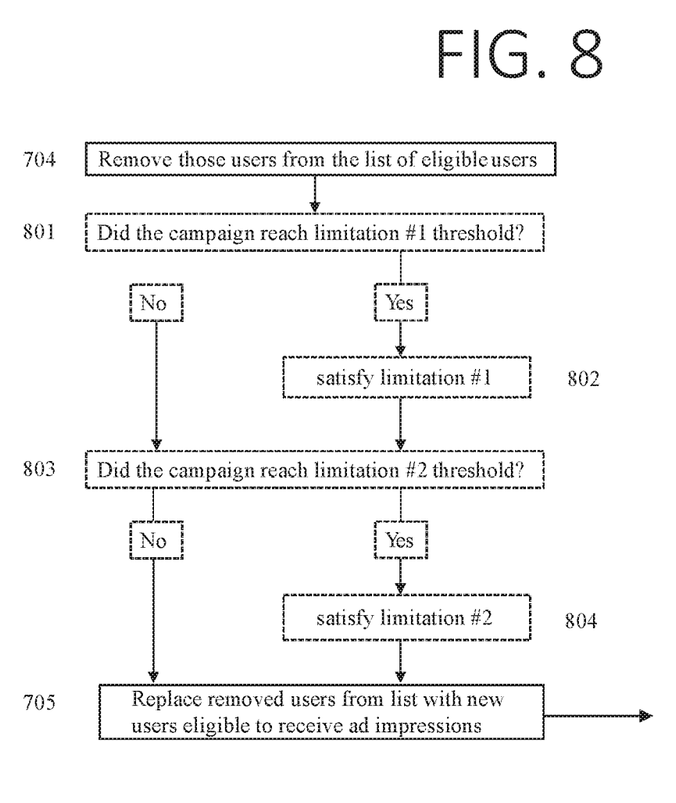
FIG. 8 shows a flow diagram of an embodiment for imposing further constraints on a reach limitation of eligible users.

FIG. 8 schematically shows a flow diagram of an embodiment for imposing further constraints on a reach limitation of eligible users. After one or more users reach the target number of ad impressions and are removed from the list of eligible users in 704, the system may ask whether the campaign or ad placement has reached any limitations or benchmarks in 801 and 803. For example, an advertiser may want to provide the optimal number of ad impressions to 1000 users who view hockey and 1000 users who view basketball. In 801, the system would determine if the received tracking pixel data resulted in 1000 users who view hockey reaching the optimal number of ad impressions. If it did, the system would remove them from the list of users eligible to receive ads in 802. The system would then repeat the steps for basketball viewers in 803 and 804. In addition, steps 802 and 804 may be any task that is required by the limitation and are not confined to removing eligible users. For example, a campaign limitation may require a minimum number of users that meet particular criteria. In this case, steps 802 or 804 may involve adding eligible users. The two campaign limitations in FIG. 8 are illustrative, not exhaustive of the limitations that advertisers may impose. Any number of limitations may be used, depending on the particular embodiment.

In another embodiment, steps 801, 802, 803, and 804 could be performed at a different time. For example, these steps could be inserted between steps 702 and 703 when limitations on the reach of the campaign do not depend on the number of users that reach the optimal number of ad impressions. This may be the case when an advertiser wants to impose a budget on ads for a particular group or wants to set a maximum number of bids for particular group.

The invention is described in detail with respect to preferred embodiments. It will be apparent to those skilled in the art that certain changes and modifications may be made without departing from the invention in its broader aspects, and the invention, therefore, as defined in the claims, is intended to cover all such changes and modifications that fall within the true spirit of the invention.

The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method for maximizing the number of users who receive an optimal number of ad impressions comprising the steps of:
   receiving tracking pixel data signifying that a user has been exposed to an ad placement;
   updating an impressions count in an eligible user list for a user that has been exposed to an eligible ad placement, wherein said list contains a limited set of users eligible to receive ad impressions based on one or more tracking pixel identifiers;
   determining whether said updating results in eligible users reaching an optimum number of ad impressions; and
   removing users that have reached the optimum number of ad impressions from said list and replacing said users with new users eligible to receive ad impressions.

2. The method according to claim 1 further comprising the step of determining whether to bid for a placement opportunity by consulting said eligible user list.

3. The method according to claim 2 further comprising the step of deleting a user from said eligible user list when said impression count reaches a threshold and adding said user to a saturation list.

4. The method of claim 3 further comprising the step of:
   determining if a user is a on a saturation list upon determining that said user is not on an eligible list, and
   adding said user to said eligible user list upon a determination that said user is not on said saturation list.

5. A method for managing a bidding process comprising the steps of:
   reviewing parameters of an auction opportunity wherein one of said parameters is user identification;
   qualifying said auction opportunity on the basis of eligible user count and user exposure count
   bidding on a qualified auction opportunity; and
   updating said user exposure count in the event of an auction success.

6. The method of claim 5 wherein said auction success is an auction award.

7. The method of claim 5 wherein said auction success is a lot delivery.

8. The method according to claim 5 further comprising the step of:
   bidding on an auction opportunity when said user ID corresponds to an eligible user ID.

9. The method according to claim 8 further comprising the step of:
   incrementing said user exposure count upon a successful auction award.

10. The method according to claim 9 wherein
   the step of qualifying further comprises the step of comparing said use exposure count to a saturation exposure count.

* * * * *